(12) United States Patent
Kohchi

(10) Patent No.: US 6,994,560 B2
(45) Date of Patent: Feb. 7, 2006

(54) EXTERNAL POWER SOURCE CONNECTING DEVICE FOR AN ELECTRIC VEHICLE

(75) Inventor: Akira Kohchi, Ashiya (JP)

(73) Assignee: Institute for Home Economics of Japan, Inc., Hyogo (JP)

( * ) Notice: Subject to any disclaimer, the term of this patent is extended or adjusted under 35 U.S.C. 154(b) by 0 days.

(21) Appl. No.: 10/741,033

(22) Filed: Dec. 19, 2003

(65) Prior Publication Data

US 2005/0136726 A1    Jun. 23, 2005

(51) Int. Cl.
    *H01R 29/00*    (2006.01)
(52) U.S. Cl. ....................................... 439/43
(58) Field of Classification Search ............... 439/34, 439/352, 35, 638–639, 650–656, 188, 441; 320/103; 200/238, 17 R
    See application file for complete search history.

(56) References Cited

U.S. PATENT DOCUMENTS

| | | | |
|---|---|---|---|
| 5,478,249 A | * | 12/1995 | Crestin ....................... 439/138 |
| 5,545,046 A | | 8/1996 | Masuda et al. |
| 5,556,284 A | * | 9/1996 | Itou et al. ..................... 439/34 |
| 5,559,420 A | | 9/1996 | Kohchi |
| 5,751,135 A | | 5/1998 | Fukushima et al. |
| 5,816,643 A | * | 10/1998 | Itou et al. ................ 296/97.22 |
| 5,909,099 A | * | 6/1999 | Watanabe et al. ........... 320/108 |
| 5,909,100 A | * | 6/1999 | Watanabe et al. ........... 320/108 |
| 6,337,448 B1 | * | 1/2002 | Konda ......................... 200/238 |
| 6,371,768 B1 | | 4/2002 | Neblett et al. |
| 6,447,302 B1 | * | 9/2002 | Davis .......................... 439/34 |

\* cited by examiner

Primary Examiner—J. F. Duverne

(57) ABSTRACT

A plurality of prongs of a connector box and a plurality of receptacles of a receptor box are electrically connected by mating each respectable pairs together. The boxes are coupled by a mechanical leveraged maneuver. The connecting device then connects vehicular circuits of an electric vehicle including those for auxiliary equipment to a battery-carrying trailer which is to be mechanically attached thereto and allows the electric vehicle to either extend its range, or be rescued from power shortage by electricity supplied by other than batteries onboard therein. The connecting device has a safety mechanism for preventing accidental separation of an electric connection, and for protecting operators from receiving electrical shock.

18 Claims, 10 Drawing Sheets

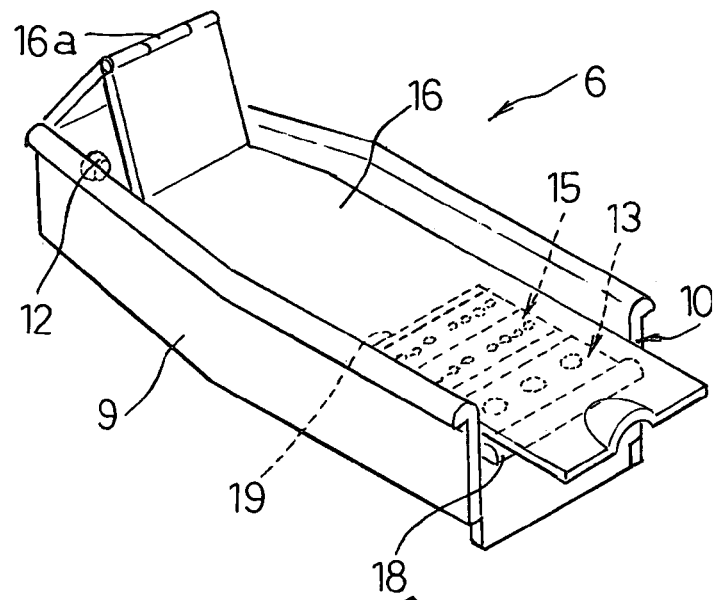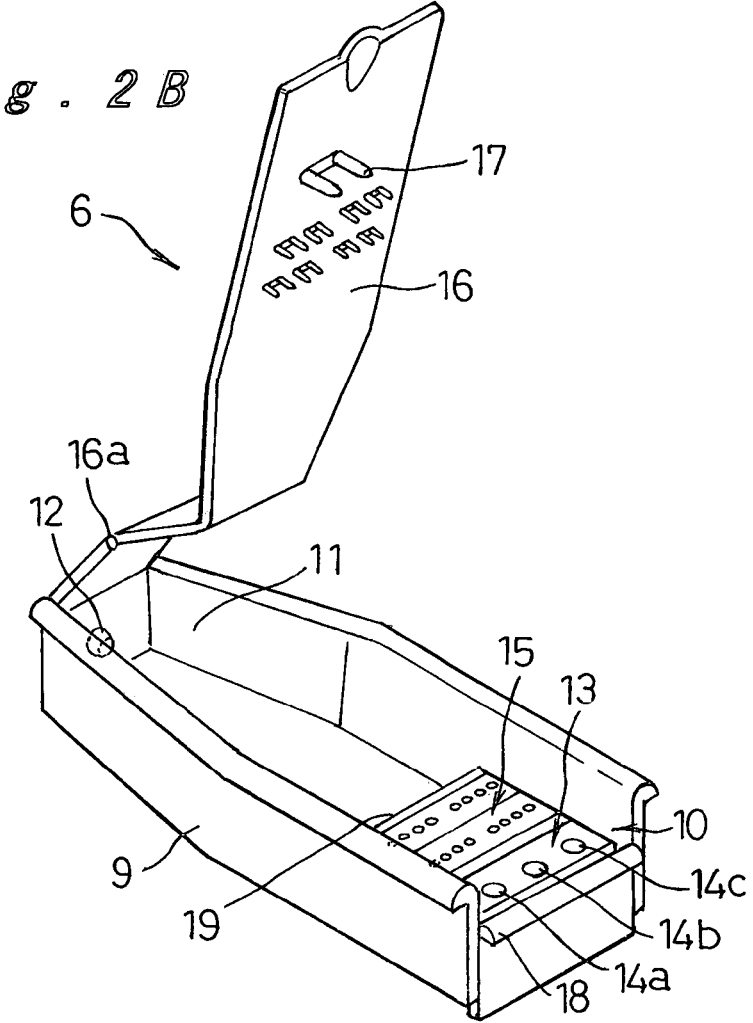

US 6,994,560 B2

EXTERNAL POWER SOURCE CONNECTING DEVICE FOR AN ELECTRIC VEHICLE

BACKGROUND OF THE INVENTION

1. Field of the Invention

The present invention relates to a connecting device for electrically connecting an electric vehicle to a battery-carrying trailer and/or an off-board electric supply system.

2. Description of Related Art

The accumulator batteries used in electric vehicles have to be periodically recharged from an electricity power grid through appropriate connecting devices. Conductive type of devices similar to household plugs have been in use, but are relatively cumbersome to handle, that is, to align mating parts and then pull them apart against a fitting-friction connection. Additionally, there are risks of possible electrical shock to operators. An inductive type of connector device has been suggested for transferring electric energy by way of electro-magnetic waves which provides easier handling and safety, but only in exchange for higher costs.

Neither type of connector provides a specific safety mechanism against any accidental pulling apart of the mating connections, which is the kind of precaution needed in the case of supplying off-board electricity from a battery-carrying trailer to electric vehicles as described, for instance, in U.S. Pat. No. 5,559,420, where two vehicles are in motion together. The evaluation of electric vehicles and the ability to rescue a disabled electric vehicle subject to a power shortage, by mechanically attaching an auxiliary battery-carrying trailer, is becoming more necessary inasmuch as Ground Positioning System and telecommunication technology have been developed to show where help is needed as well as when help is available.

However, an electric vehicle should have a receiving port at its tail-end because the source of electricity supply is to be towed behind it. Many conventional electric vehicles have their recharge ports normally positioned at the front of the vehicle, and it would be generally impractical for an electric vehicle to have two separate ports. In addition, a battery-carrying trailer itself requires recharging by a commercial power grid. Thus, the prior art is still seeking an efficient and economical solution to these issues.

SUMMARY OF THE INVENTION

In view of the foregoing problems of the prior art, an object of the present invention is to provide an external power source connecting device for an electric vehicle which can prevent any unintended separation of an electrical connection of the electric vehicle with battery-carrying trailers and/or off-board electric supply systems by providing an inexpensive and easy, yet safe to handle, safety mechanism thereon.

A further object of the present invention is to provide an external power source connecting device for electric vehicles which may be used for multiple purposes involved in operating electric vehicles and battery-carrying trailers.

In order to achieve the aforementioned objects, an external power source connecting device for an electric vehicle, of the present invention, comprises a receptor unit having a plurality of receptacles for either completing or breaking vehicular circuits at one time; a connector unit having a plurality of prongs to mate with the receptacles and having a safety mechanism against any accidental pull-apart force. The construction of the receptor unit and the connector unit is provided in such a manner to generate a force applying leverage for easy handling and to assure safety, and to accommodate related wiring from the receptor unit and the connector unit to the drive motors of an electric vehicle and its vehicular circuits, to the batteries onboard the vehicle, to batteries onboard a battery-carrying trailer and to a power grid, respectively.

While novel features of the invention are set forth in the preceding description, the invention, both as to organization and content, can be further understood and appreciated, along with other objects and features thereof, from the following detailed description and examples when taken in conjunction with the attached drawings.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIGS. 2A and 2B illustrate perspective views of a receptor unit of the external power source connecting device on the electric vehicle according to an embodiment of the present invention. FIG. 2A shows the receptor unit with a lid closed and FIG. 2B shows the receptor with the lid opened.

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

One preferred embodiment of an external power source connecting device for an electric vehicle according to the present invention will be hereinafter described with reference to FIG. 1 to FIG. 10.

Figure 1:
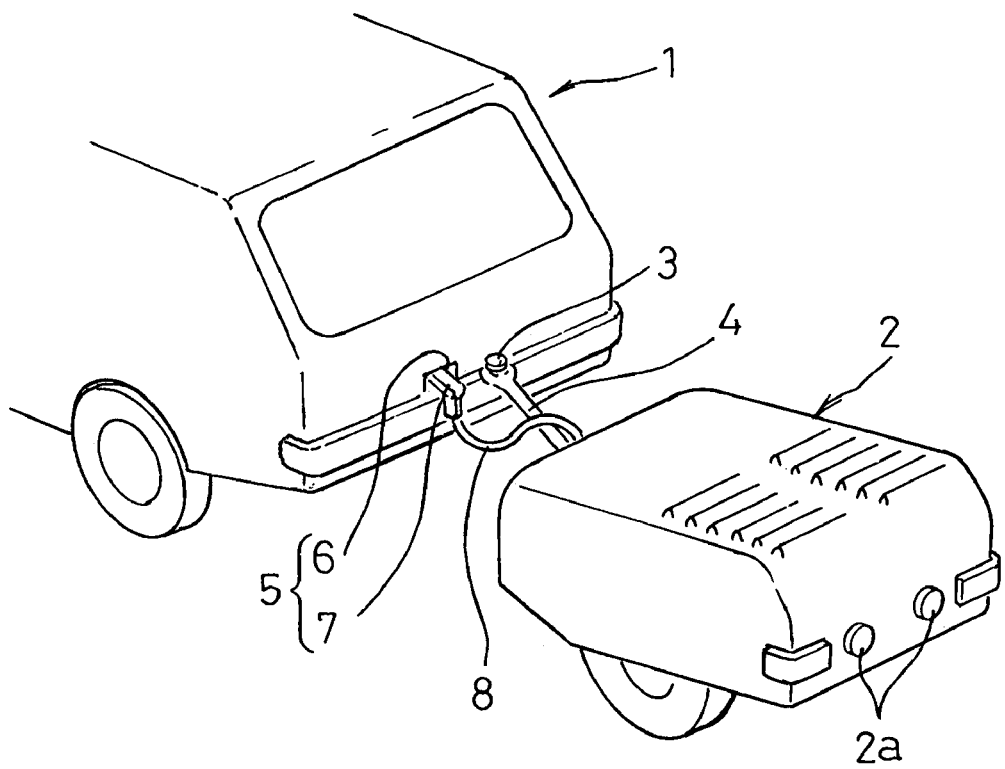
FIG. 1 is a perspective view illustrating an electric vehicle mechanically connected with a battery-carrying trailer applying an external power source connecting device of electric vehicle according to one embodiment of the present invention.

FIG. 1 illustrates an electric vehicle 1 and a battery-carrying trailer 2 which is mechanically attached to the vehicle 1 by way of a ball 3 and an eyed tie-rod 4, an electrically connective unit 5 comprising a receptor unit 6 attached on the rear of the vehicle and a connector unit 7 attached to an end or tip of a cable 8 is used to supply off-board electricity from a power source to the vehicle, when the vehicle is incapable of being driven by its own power.

A power shortage is liable to occur for electric vehicles when a timely recharge has been forgotten, a planned itinerary is overridden, and chance incidents or vehicular failure is faced. The battery-carrying trailer 2, providing an off-board source of electricity supply, may be used either for rescuing disabled vehicles on such occasions or simply for extending the driving range of the vehicle.

Referring to FIGS. 2A and 2B perspective views of the receptor unit 6 are shown, a lid 16 is in a closed position over a receptor box 9 in FIG. 2A whereas it is shown opened in FIG. 2B. The lid 16 has a hinge 16a. The receptor unit 6 is to be located at the rear end of the vehicle 1 through which all of the vehicular electrical power line circuits are channeled. The driving circuit is channeled by way of a receptacle box 13, and auxiliary circuits such as for various functional lights are channeled by way of receptacle box 15. A pair of electrically conductive prongs 17 completes or connects, when the lid is closed, the driving circuit from the onboard batteries to a controller and drive motors.

Figure 3A:
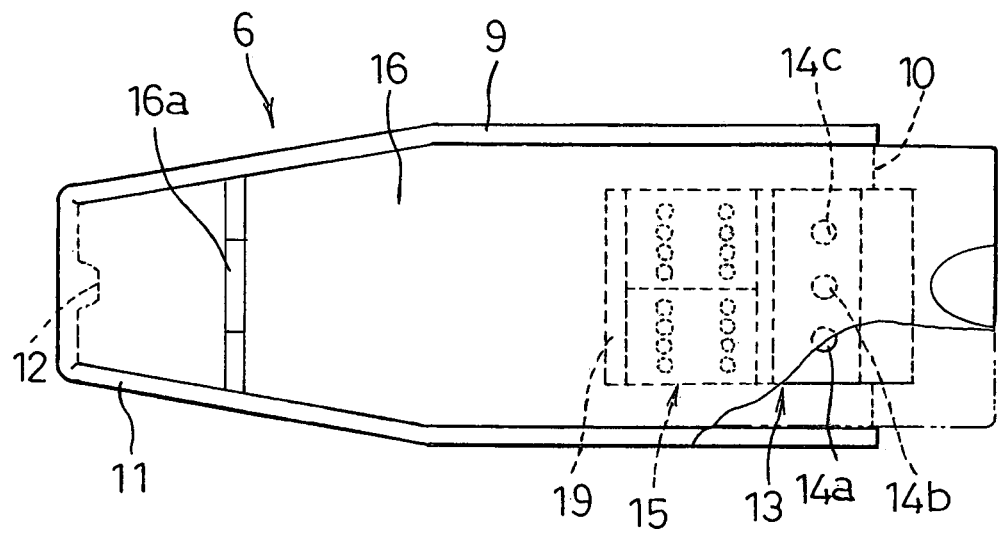
FIGS. 3A and 3B illustrate respectively a horizontal view and a cross-sectional view of the receptor unit according to the embodiment of the present invention with the lid closed respectively.
Figure 3B:
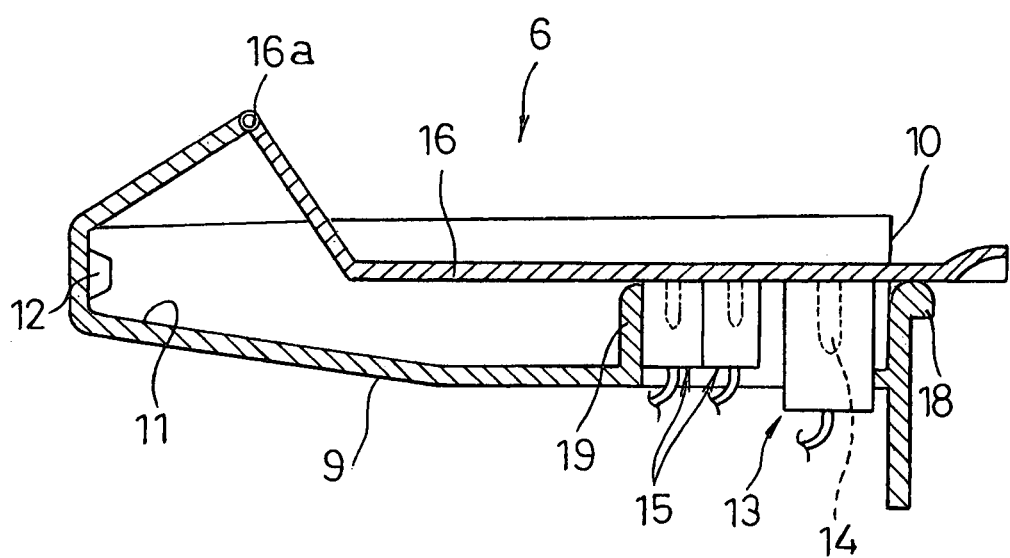

FIGS. 3A and 3B show the receptor unit 6 and relative locations of receptacle boxes when the lid 16 is closed. The lid can be friction-held against the receptor casing 10 and stopped at an inner wall 19. Alternately, a locking device (not shown) can be added to prevent tampering. The receptacle boxes 13 and 15 are held within a cutout defined on the receptor casing 10 and by the inner wall 19.

Figures 4A, 4B:
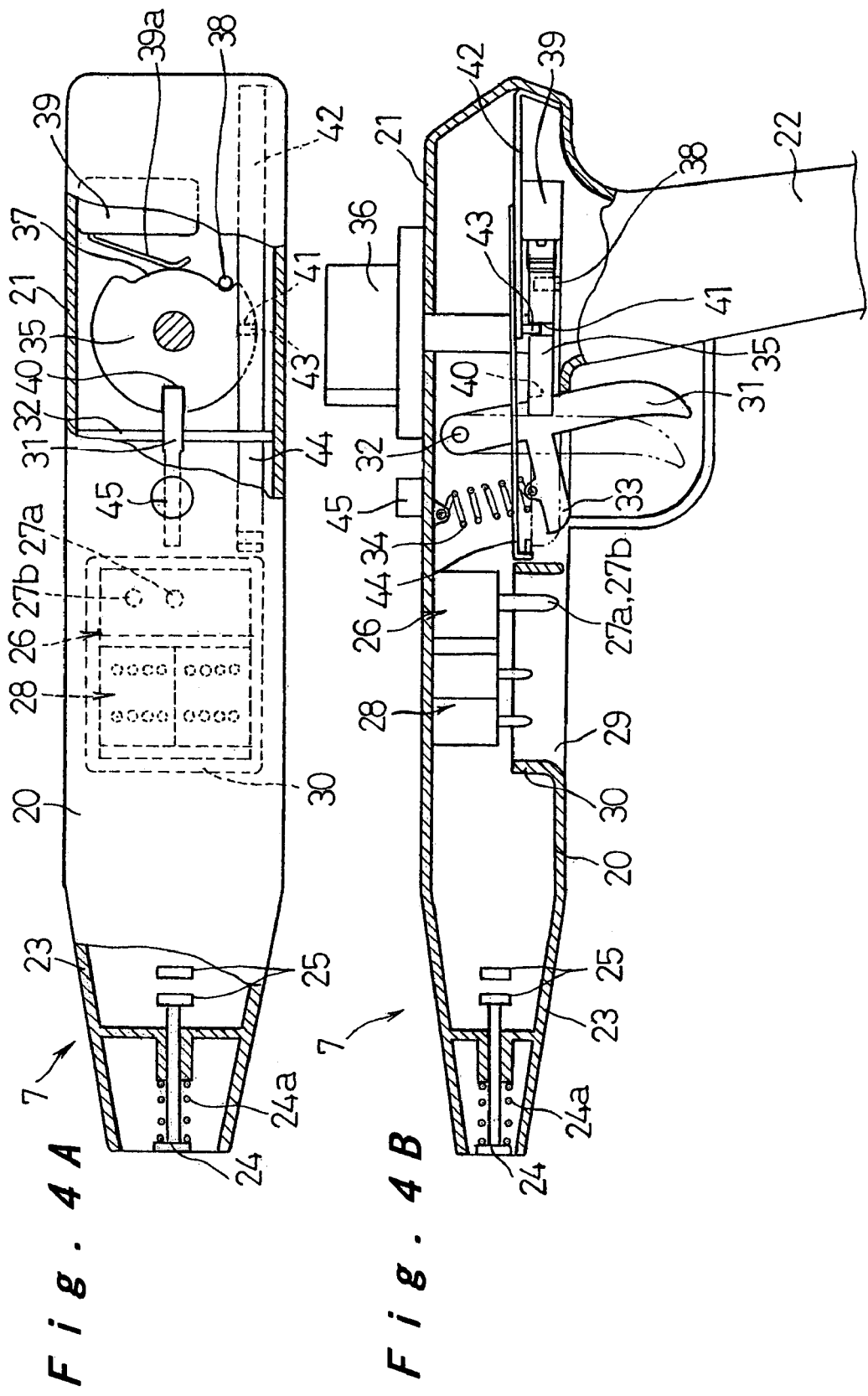
FIGS. 4A and 4B illustrate a horizontal view and a cross-sectional view of a connector unit of the external power source connecting device of an electric vehicle according to any embodiment of the present invention respectively.

FIGS. 4A and 4B show the connector unit 7 in the general form of a nozzle gun in an unlocked mode in which a safety trigger 31 is free for movement by an operator. The entire connector unit 7 is shock-free as the first safety contact 25 is shown in an open position to break any electricity supply to the mating power prongs 27a and 27b. The prong boxes 26 and 28 are positioned to match and align with the sockets or ports on receptacle boxes 13 and 15 on the receptor unit 6 as shown in FIG. 3. The safety trigger 31 is free to move so it may be generated to slide into a notch 40 cut on a control cam 35, which is held immovable by a wedge member 43, tensioned down by a spring 42, which is dropped down into a notch 41 cut on the same cam. Otherwise, the control cam 35 is designed to rotate and be operator thumb-turned by the exterior knob 36. All cords, omitted from illustrations for clarity, run through a handle grip 22. Note, the prongs 27a and 27b are positioned within a recess 29 in the housing 20.

A pilot lamp 45 is off in this mode. Other types of colored lamps, for instance, showing the current charge status of batteries, may be added.

Figure 5:
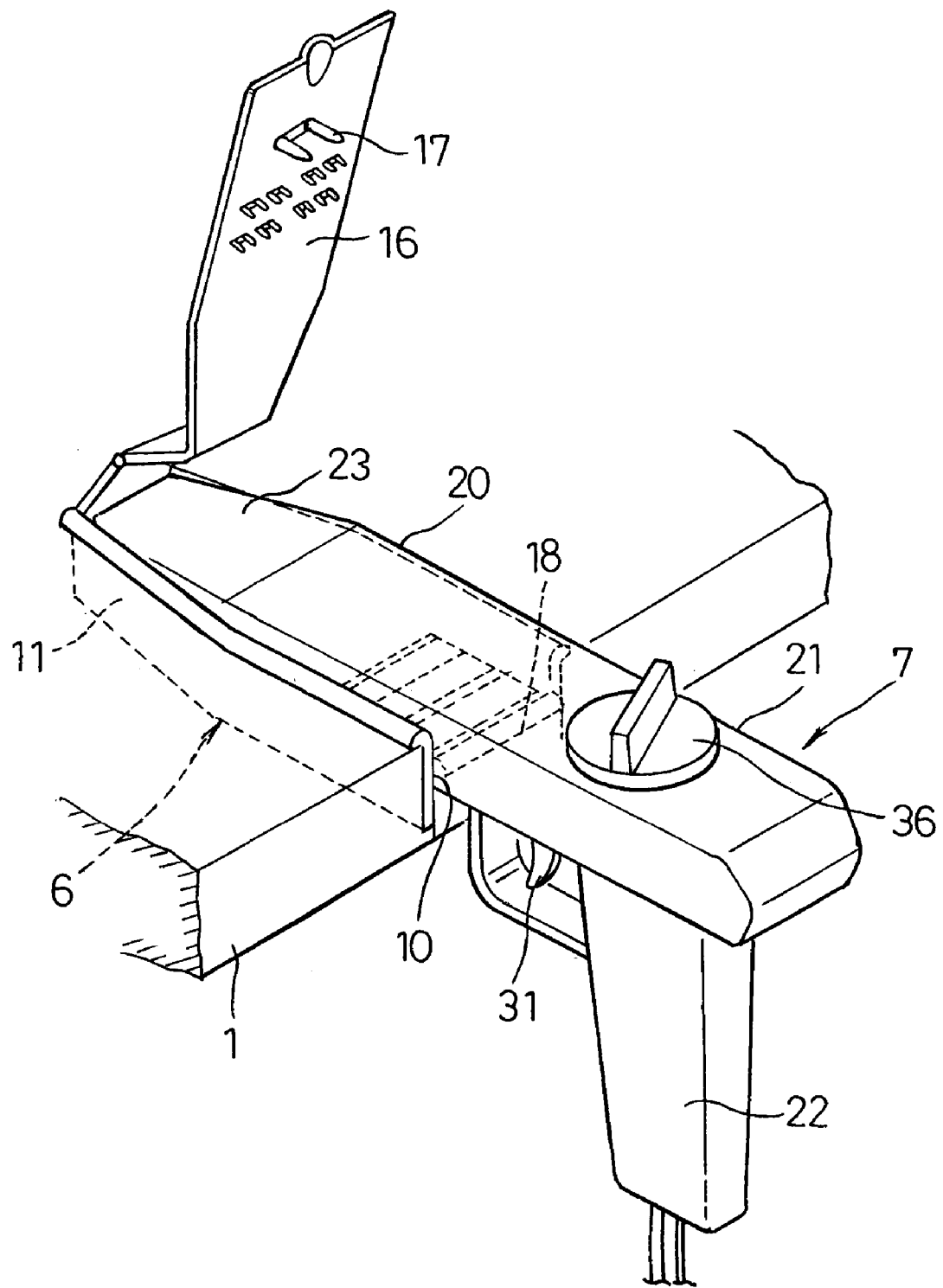
FIG. 5 illustrates a perspective view of electrical connection between the receptor unit and the connector unit for supplying electricity.
Figure 6:
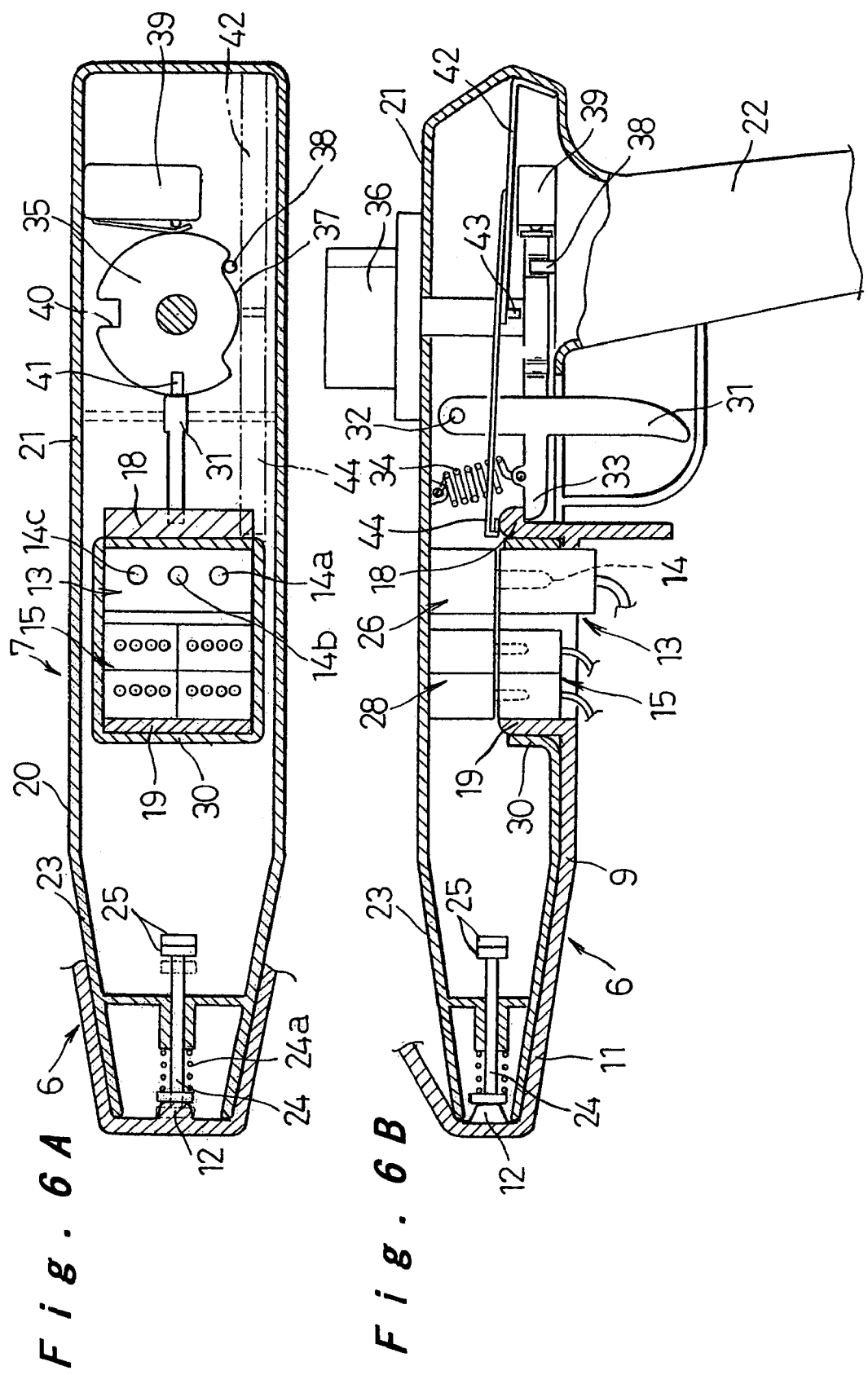
FIGS. 6A and 6B illustrate a partially cutaway horizontal view and a partially cutaway cross-sectional view of the electrical connection between the receptor unit and the connector unit for electricity supplying according to the embodiment of the present invention respectively.

As is shown in FIG. 5, the connector unit 7 can to be coupled with the receptor unit 6 which is on the electric vehicle 1. First, the lid 16 is opened and the operator inserts the connector unit 7 into the receptor unit 6, with the nozzle tip 23 against the protrusion 12 provided on the front wall of receptor box 9 as shown in FIGS. 3A and 3B, as well as against the bias of the spring 24a provided within the housing or connector body 20 as shown in FIGS. 4A and 4B, thereby making the first safety contact 25 close in an automatic manner. Then the connector unit 7, held by hand, is pivoted in a downward motion against the front wall to provide a mechanical force advantage until it is stopped at the receptor threshold 18.

Inserting the connector unit 7 into the receptor unit 6 is automatically guided by the slanted shaped tips 23 and 11 and requires no visual verification for this maneuver. The action involved is akin to the handling maneuver of a conventional gasoline-feeding nozzle that people are accustomed to. This action produces leverage at a fulcrum formed by the shaped tips 23 and 11 of the housing for the connector unit 7 and of the housing for the receptor unit 6 when they meet. This pivoting snap or yanking motion would require less force than the motion required for a linear thrusting of a conventional conductive set of prongs and sockets because of the mechanical advantage of the present invention.

FIGS. 6A and 6B show an inner mechanism of the connector unit 7 after it has been coupled with the receptor unit 6 and the knob 36 has been thumb-turned clockwise, whereby electricity is free to run through the prong boxes 26, 28 and the mating receptacle boxes 13, 15.

Coupling at a correct relative position, and thereby ensuring proper mating of the prongs with the receptacles, is assisted by the vertical guide wall 30 on the connector unit 7 and the vertical guide wall 19 on the receptor unit 6. During a yank down process, the rounded-off trigger tip 33 rides over the receptor threshold 18. Then the spring 34 pulls back the tip 33, locking it with the ledge or flange on the threshold 18. The wedge 43 is now forced out of the notch 41 as the spring tip 44 is pushed upward by the receptor threshold 18, enabling the control cam 35 to be turned. The stop pin 38 defines the permissible turn angles. As the knob 36 is thumb-turned clockwise, the second safety switch contact 39 is closed by the control cam 35, and electricity is now permitted to run through the entire unit as explained above, during which time any movement of the safety trigger 31 is restricted by the control cam 35. As can be appreciated, the relative position of the receptacles and prongs could be switched between the connector unit 7 and the receptor unit 6.

To discontinue an operation of supplying external electricity, the above procedure is reversed, first, the knob 36 is thumb-turned counter-clockwise back, the safety trigger 31 is squeezed to release the trigger tip 33 from the lock, the connector unit 7 is yanked upward by the operator, and it is ejected by the spring 24a out of coupling with the receptor unit 6. Thus, the present invention incorporates first and second electrical safety switch units to protect the operator.

Figure 7:
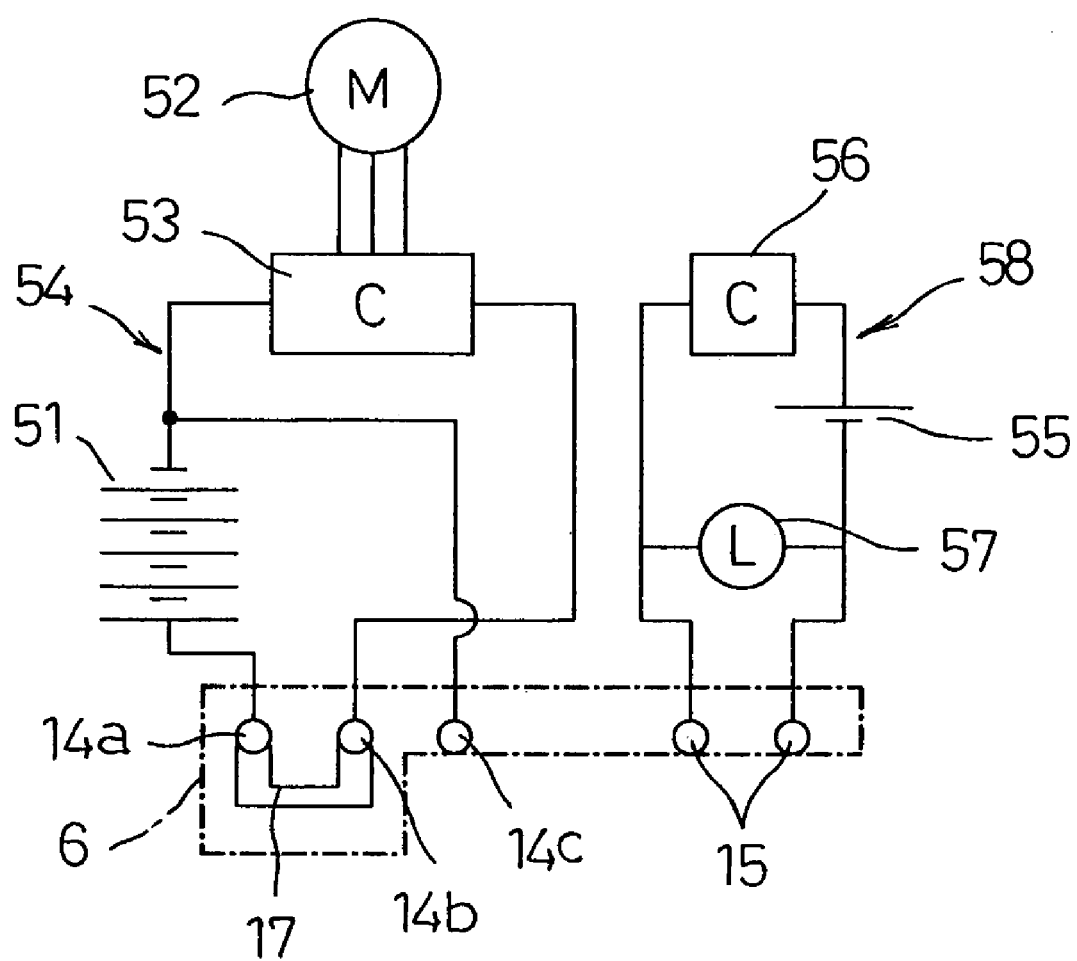
FIG. 7 illustrates a circuit diagram of the electric vehicle while the lid of the receptor unit is closed and the vehicle is operating without being electrically connected to the battery-carrying trailer according to an embodiment of the present invention.

FIG. 7 shows the vehicular circuits when an electric vehicle is made operable in a normal manner, with no electricity supply from a battery-carrying trailer. The receptor unit 6 is located at the rear-end of the vehicle 1 and the lid 16 closed, thus completing the drive circuit 54 in which electricity from onboard batteries 51 is led respectively through the receptacle 14a, the bridging prongs 17 on the closed lid, the receptacle 14b, and the controller 53 to the drive motors 52. The auxiliary circuit 58 is likewise completed through the bridged receptacles 15 in which an auxiliary battery 55 is used to power various vehicular lights 57 that are switched on or off by the control devices 56.

Figure 8:
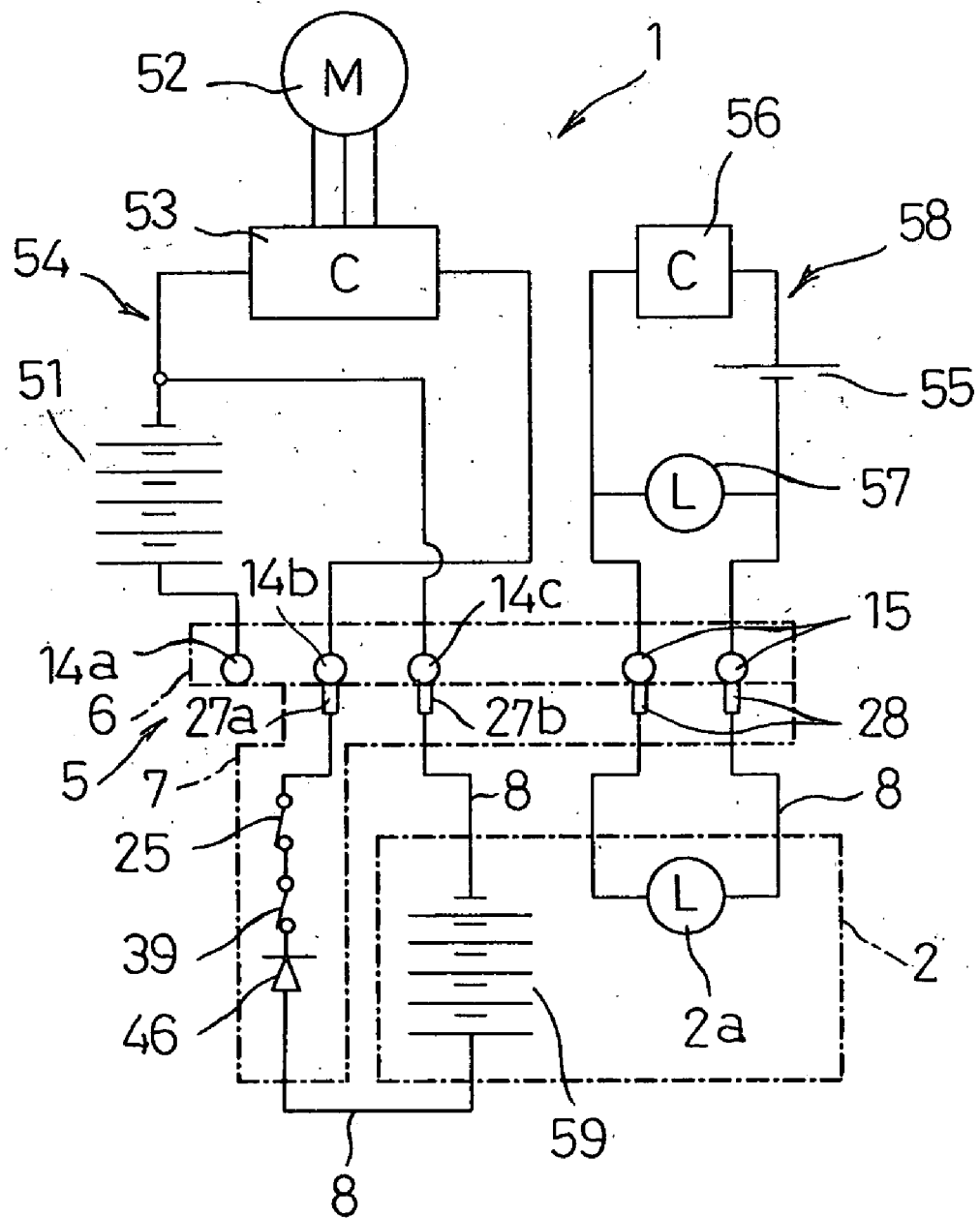
FIG. 8 illustrates a circuit diagram of the electric vehicle and the battery-carrying trailer while the connector unit of the battery-carrying trailer and the receptor unit of the electric vehicle are electrically connected together according to the embodiment of the present invention.

FIG. 8 shows the vehicular circuits where a battery-carrying trailer 2 is mechanically attached to an electric vehicle and electrically connected by the connective unit 5 to accumulator batteries. The batteries 59 on the trailer now supply needed electricity to the drive motors 52, in place of the batteries 51 on the vehicle.

The pair of prongs 27a and 27b, located on the connector unit 7, as shown in FIG. 4, mate with the receptacles 14b and 14c on the receptor unit 6, and is differentiated in its relative location from that of the bridging pair 17 on the lid 16. The pair 17 mates with the receptacles 14a and 14b, as shown in FIG. 7.

The prongs 27a and 27b will not provide an electrical shock to an operator because the drive circuit 8 is double-shielded by the two safety contacts 25 and 39 against unintentional completion. A diode 46 directs current. Various inter-vehicular communications including lighting such as the taillights 2a shown in FIG. 1 are subjected to the control devices 56.

Figure 9:
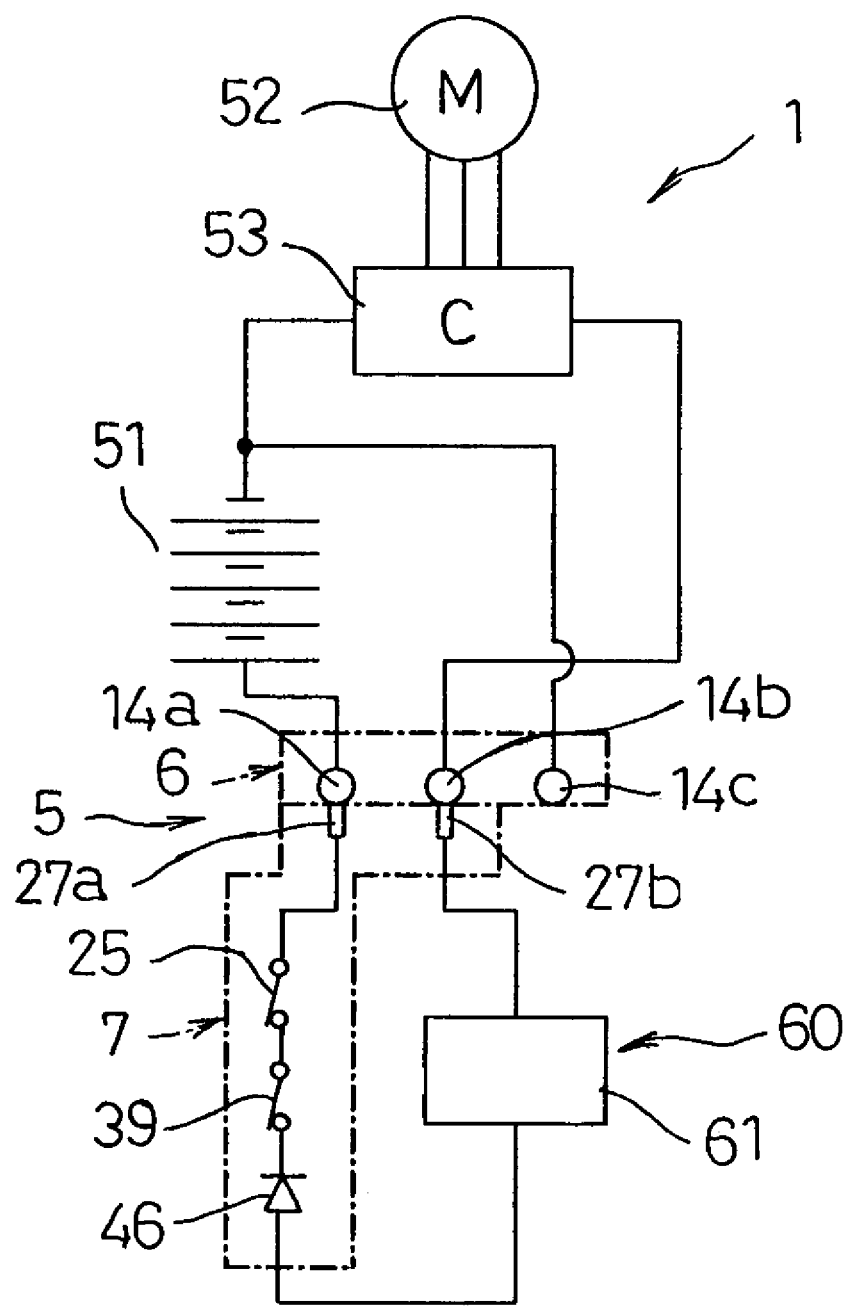
FIG. 9 illustrates a circuit diagram of the electric vehicle while the electric vehicle is electrically connected to an off-board power supply system for recharging batteries onboard the electric vehicle according to an embodiment of the present invention.

FIG. 9 shows the circuits formed for recharging an electric vehicle by the power grid. The connector unit 7 in this case is attached to an end of the cable from a charger 61 located at the recharging station 60, and is modified as to the location of its prongs. The recharging prongs 27a and 27b now mate with the receptacles 14a and 14b, and electricity supply is directed to the batteries 51 on the vehicle 1.

Figure 10:
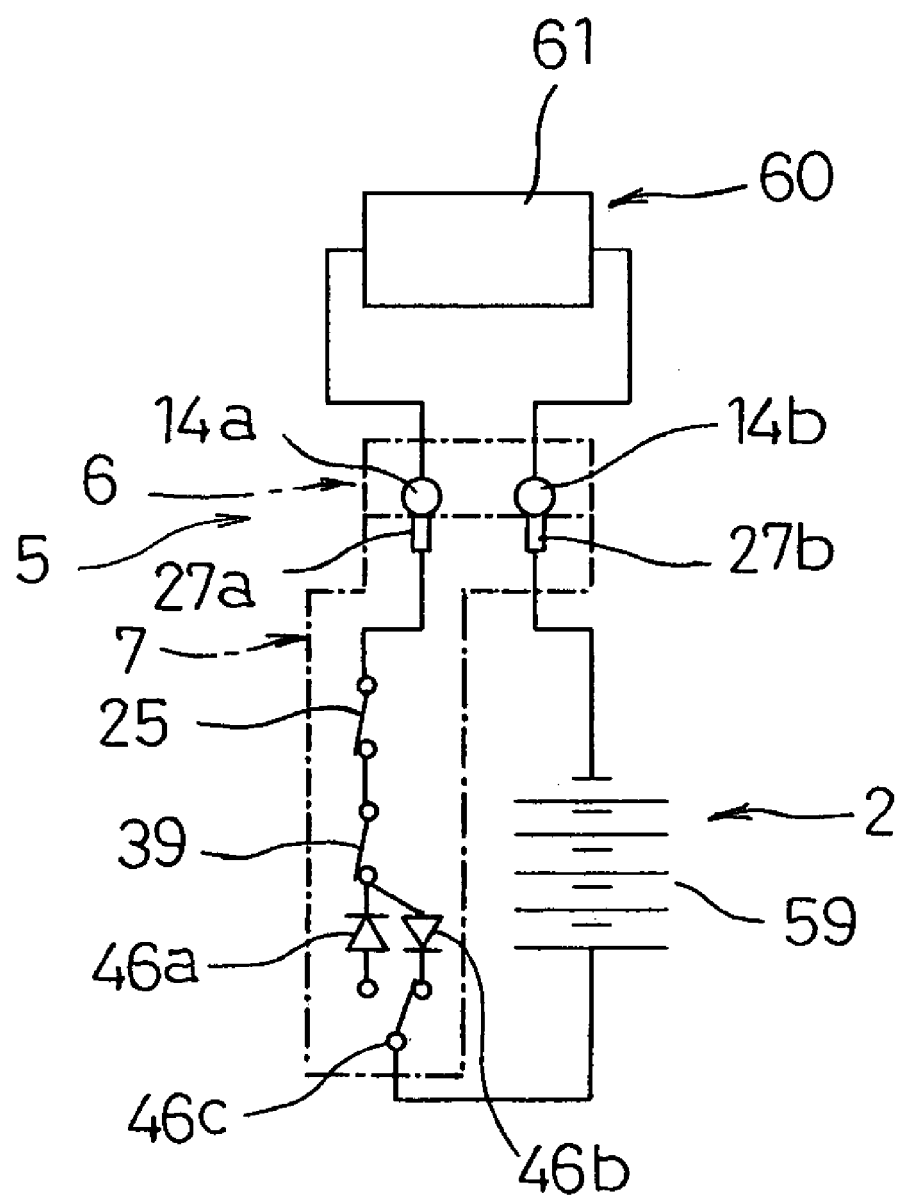
FIG. 10 illustrates a circuit diagram of the battery-carrying trailer while the battery-carrying trailer is electrically connected to an off-board power supply system for recharging batteries onboard the battery-carrying trailer according to the embodiment of the present invention.

FIG. 10 shows the circuits formed for recharging a battery-carrying trailer by the grid. The receptor unit 6 in this case is attached to the charger 61 which is located at the recharging station 60, and is modified to include a protrusion (not illustrated) to actuate the switch 46c which, provided within the connector body 20 shown for instance in FIGS. 4A and 4B, directs current to the batteries 59 on the trailer 2.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. An external power source connecting device for an electric vehicle comprising:
   a receptor unit configured for location at a rear end of an electric vehicle for accepting a supply of electricity and having at least one pair of receptacles mounted therein;
   a removable connector unit connected to an electric cable from a supply source of electricity, having at least one pair of prongs of a configuration to mate with the pair of receptacles; and
   electric cords for connecting said receptor unit with vehicular circuits of said vehicle,
   wherein said connector unit is located at an end of the electric cable extending from accumulator batteries carried on a trailer mechanically attached to the vehicle, and said electric cords are connected to drive motors of the vehicle, when the connector unit is coupled with the receptor unit, the pair of prongs mate with the pair of receptacles, thereby completing a drive circuit from the batteries on the trailer and enabling the vehicle to operate on electricity supplied externally from the trailer.

2. The external power source connecting device according to claim 1, wherein a plurality of prongs are provided on the connector unit and a plurality of mating receptacles are provided on the receptor unit respectively and electric cords of auxiliary equipment of the vehicle are connected with the receptor unit in series, thereby upon coupling of the connector unit with the receptor unit making the operation of auxiliary equipment of said vehicle synchronized with the operation of auxiliary equipment of the trailer, and coupling or separating of the connector unit with or from the receptor unit completes or breaks all of the circuits of the trailer at one time.

3. The external power source connecting device according to claim 2, wherein the connector unit has an extension of a body member perpendicular to the axis of the prongs, and the receptor unit has an extension of a body member perpendicular to the axis of the receptacles, and the extensions can be mounted together to meet and provide a fulcrum on one tip of one of the extensions and a matching fulcrum holder on the other extensions, thereby generating a mechanical leverage for overcoming any resistance caused by friction-fitting prongs and receptacles at the time of coupling or separating by engaging, prior to the coupling, the fulcrum holder with the fulcrum.

4. The external power source connecting device according to claim 3, wherein the receptor unit is a box with no substantial ceiling and with a continuous opening on a frontal wall which is opposite of said extension, having the receptacles facing upwards, and the connector unit is a head-and-body box, the head of which, when coupled with said receptor unit, snugly fits into said receptor unit, whereas the body protrudes out of said frontal wall of said receptor unit and, having the prongs in said head and facing downwards, and a spring unit is added to the meeting point of said extensions, thereby forming a fulcrum mechanism at the tips of said extensions and a maneuver of levering down or up is used in said coupling or separating and ejecting said connector unit upon said separating is made easy while permitting an aligned mating of the prongs with the receptacles is assured, thereby allowing an operator to associate manipulation with that action of a gasoline pumping into a vehicle.

5. The external power source connecting device according to claim 4, wherein a first safety switch, provided on the extension of the connector unit, is made operable by a forced contact against a protrusion provided on the rear wall of the receptor unit, and a trigger member is provided on the underside of the connector body which hooks the connector unit to the receptor unit when coupled, and a thumb-operated locking unit is provided on the upside of the connector body which prohibits free movement of the trigger member so long as circuits are completed, and lamps on the connector unit indicate completion or breaking of the circuits, and a spring-tensioned wedge member is provided for holding the thumb-operated locking unit to stay at an inactive end until released by the coupling of the receptor unit, and a second safety switch, provided inside the connector body, is made operable by turning the thumb-operated locking unit, thereby ensuring a completion of circuits only when the connector unit and the receptor unit are coupled correctly and the trigger member is held immovable by the thumb-operated locking member and the first and second safety switches are operated together.

6. The external power source connecting device according to claim 5, wherein said connector unit is located at an end of an electric cable from a power grid, thereby enabling a recharge circuit from said grid to batteries onboard said vehicle and enabling said vehicle to be recharged by said power grid.

7. The external power source connecting device to claim 6, wherein said receptor unit is located at and connected with the power grid, and a protrusion provided on the receptor unit actuates a switching unit provided inside the connector unit for reversing the direction of electric current, thereby upon said coupling completing a recharge circuit from the power grid to batteries onboard the trailer and enabling the trailer to be recharged by the power grid.

8. The external power source connecting device according to claim 5, wherein the receptor unit includes a lid which is hinged at the extension and a plurality of bridging prongs are provided on an inner side of the lid and when the lid is closed, the prongs mate with the receptacles, thereby, closing of the lid completes a drive circuit from the batteries on the vehicle to drive motors of the vehicle as well as all the vehicular circuits for auxiliary equipment of the vehicle and enabling the vehicle to operate.

9. An external power source connecting device for an electric vehicle comprising:
a receptor unit configured for location on an electric vehicle for accepting a supply of electricity and having at least one pair of electrical receptacles mounted thereon;
a removable connector unit connected to a supply of electricity having a set of electrical contacts of a configuration to be engageable with the electrical receptacles when aligned;
a first electrical safety switch unit for opening and closing a power line upon an initial engagement of the removable connector unit with the receptacles;
a second electrical safety switch unit for opening and closing the power line which is enabled by a subsequent engagement of a portion of the removable connector unit with the receptacles whereby both the first and second electrical safety switch units must be closed before electrical power is connected; and
electric conductors for connecting the receptor unit with vehicular circuits in the electric vehicle.

10. The external power source connecting device of claim 9 further including a trigger member on the removable connector unit for controlling a mechanical latching with the receptor unit and for enabling the second electrical safety switch unit.

11. The external power source connecting devices of claim 10 further including a rotatable knot on the removable connector unit that can be rotated by an operator to close the second electrical safety switch unit when the removable connector unit is latched to the receptor unit.

12. The external power source connecting device of claim 9, wherein the removable connector unit has a housing of an elongated gun configuration with a handle for grasping by the operator.

13. The external power source connecting device of claim 12, wherein the second electrical safety switch unit is adjacent the handle on the housing.

14. The external power source connecting device of claim 13, wherein a set of electrical contacts is provided on the housing between the first and second electrical safety switch units.

15. The external power source connecting device of claim 14, wherein the set of electrical contacts is recessed within the housing to enable an insertion of the housing in a first direction for an initial engagement and an engagement of the electrical contacts when the housing is moved in a second direction to enable the second electrical safety switch unit.

16. An external power source connecting assembly for an electric vehicle comprising:
a receptor unit configured for attachment to an electric vehicle and to electrical power lines for supply power to the electric vehicle including an elongated housing having a bottom with electrical contacts thereon, and a front wall;
a connector unit including an elongated housing of a configuration to mate with the receptor unit elongated housing;
a set of electrical contacts provided on a bottom surface of the connector unit housing and of a configuration to be engageable with electrical contacts on the receptor unit when aligned, wherein a distal front end of the connector unit is in contact with the front wall of the receptor unit and a pivotal movement of the connector unit provides an operative engagement of the respective electrical contacts; and
electric conductors for connecting the receptor unit with electrical circuits in the electric vehicle and an automatic first electrical safety switch unit for connecting a power line upon an initial engagement of the distal front end of the connector unit with the front wall of the receptor unit.

17. The external power source connecting assembly of claim 16, wherein the connector unit has an operator handle and a trigger member adjacent the operator handle for controlling a mechanical latching of the connector unit housing with the receptor unit housing.

18. The external power source connecting assembly of claim 16 further including a second electrical safety switch unit for opening and closing the power line which is enabled by a subsequent engagement of a portion of the connector unit housing with the receptor unit housing whereby both the first and the second electrical safety switch units must be closed before electrical power is connected, the second electrical safety switch unit includes a rotatable knob on the connector unit housing that can be rotated by an operator to close the second electrical safety switch unit.

* * * * *